UNITED STATES PATENT OFFICE.

CARLETON ELLIS, OF MONTCLAIR, NEW JERSEY.

HYDROGENATED EDIBLE FAT PRODUCT.

1,058,738. Specification of Letters Patent. Patented Apr. 15, 1913.

No Drawing. Application filed August 15, 1912. Serial No. 715,209.

*To all whom it may concern:*

Be it known that I, CARLETON ELLIS, a citizen of the United States, and a resident of Montclair, in the county of Essex and State of New Jersey, have invented certain new and useful Improvements in Hydrogenated Edible Fat Products, of which the following is a specification.

This invention relates to a composition containing edible hydrogenated oils or fats, and relates in particular to oily or fatty products, preferably of a composite nature containing edible hydrogenated oil material derived by the hydrogenation of unsaturated oily material in a certain manner to afford oils or fats either of a butter-like or of a lard-like consistency or of other desired consistency which are essentially or substantially free from deleterious or toxic bodies such as are sometimes present in the normal oils, and which have other desirable qualities as will be hereinafter set forth.

Most oils of a vegetable nature and some animal oils contain from traces up to considerable quantities of highly unsaturated bodies, including those of the linoleic and linolenic group. These and other similar bodies are very sensitive to oxidation and lend instability to such edible oil products of this character by their tendency to change chemically and thus alter the flavor of the material. Some also contain nitrogenous or other bodies of a deleterious or toxic character which may be destroyed under certain conditions of hydrogenation so that the oil or fat becomes safely edible and without cumulative and dangerous effects when taken in large quantities for protracted periods.

It is the object of the present invention to provide a composition essentially or substantially free from these or other objectionable bodies. This may be accomplished by very careful hydrogenation up to the degree of consistency required in the edible product, but such hydrogenation is difficult to carry out commercially on a large scale with the assurance that the product will run uniform in quality. Therefore, I prefer to carry out the treatment by saturating these bodies with hydrogen or other harmless additive element or radical to an excessive degree as regards final consistency, so as to cause these bodies to lose their identity and become substantially free of odor of origin and tendency to rancidify or otherwise be decomposed.

As stated in Serial No. 714,393, filed August 10, 1912, by hydrogenating soya bean, cotton seed or corn oil or similar oils to materially reduce the idoin number, the more sensitive double bonds are saturated with hydrogen and thereby eliminated and oxidation tendency is reduced to a minimum. Apparently the complete elimination of all the double bonds characteristic of the linoleic type is more difficult than the removal of the double bonds characteristic of the linolenic type, so that control over this seeming selective action during hydrogenation when saturated up to a given degree of consistency from a given oil, is difficult, if not impossible under ordinary conditions of hydrogenating. If, however, the oil is over-hydrogenated so that a more consistent fat is acquired than is actually desired for an edible product, the unstable bodies thus may be completely transformed, that is to say they are chemically converted into different chemical compounds. By this over or super hydrogenation the linoleic as well as the linolenic and isolinolenic bodies and the like are substantially completely transformed and other desirable deep seated reactions occur which afford a product possessing useful characteristics. In order to secure the degree of consistency desired I may cool the hot hydrogenated fat gradually to about 30° C. when the temperature may be maintained between 25° C. to 35° C. or so for several hours to induce crystallization or balling of the high melting point compound. The mass is then pressed to the desired degree, the pressing being conducted in the manner well known in the art. The press cake contains the excess of stearins and other high melting bodies produced by hydrogenation. The expressed material contains unchanged oleins, some hydrogenated bodies, unsaponifiable oils, etc. The extracted oil is then preferably bleached using for this purpose fullers' earth, ozone, oxygen and the like. Fish oil preferably should be treated with ozone followed by filtration in a heated condition through fullers' earth. The bleached oil is then combined with such proportion of the stearin as gives either the buttery or the lard like mass desired. Usually one to three parts of the so-called stearin is added, to about 5 parts of the oil. This mixture is preferably chilled and whipped or otherwise agitated in the presence of air or other gas, as nitrogen or pure hydrogen, to give what may be termed a vesiculated mass. Or, the super-hydrogenated product may be pressed at a temperature which eliminates only a portion of the stearin-like bodies and thus affords the consistency required with the completion of the deep seated reaction occurring during hydrogenation under these circumstances. The product of the requisite consistency thus derived may best be bleached with fullers' earth or other bleaching agents or otherwise treated as by blowing with superheated steam at 150° to 250° C. while subjecting the oil or fat material to reduced atmospheric pressure. Such a superhydrogenated pressed product which may be made either of butter-like or of lard-like consistency is obtained from a number of common animal and vegetable oils or mixtures of these possessing a number of desirable properties. Such products when properly prepared without resorting to ordinary forced hydrogenation at excessively high temperatures are stable in storage and are not liable to coagulate on standing with the formation of objectionable masses of granulous stearin-like bodies. The product is free from objectionable odor and does not acquire any resinous stale taste upon standing for an indefinite period, nor does it resume its original odor on standing. Fish oil or whale oil may be hydrogenated slightly in excess and then pressed to soft tallow or lard-like consistency and bleached. The fat product will then be found free from fishy odor having a pleasant odor recalling fresh tallow. Scarcely any of the original flavor remains and the very slight tang which is usually apparent is not of a disagreeable nature.

Another feature of the present product is that apparently it does not on long standing act upon tin or tin-containers so that the oil does not become more or less charged with tin compound. The hydrogenated product made under some circumstances bears a moderate addition of other oils which have not been hydrogenated, or have not been subjected to the action of hydrogen; the hydrogenated product embedding and protecting those other less stable oils from the normally spontaneous reaction or changes which they are well known to frequently experience.

The product may be made capable of standing the relatively high temperatures such as are incident to culinary operations without the formation of acrolien fumes and other objectionable bodies.

Another very desirable feature of the product in its preferred form is what may be termed the melting point lag, involving a seemingly peculiar lack of immediate response to temperature fluctuations which is often very pronounced and which enables the production of soft edible products not melting easily in hot weather.

Among the vegetable oils corn, cotton seed, soya bean, peanut, sesame, olive, rape, cocoanut, castor, and palm oils or animal oils such as those of lard and tallow and other oleins and palmitins with more or less stearins, all of an animal nature, fish and whale oils, codliver oil and the like may be employed either in the hydrogenated or unhydrogenated condition in compounding products under the present composition.

I have noted that when a vegetable oil such as cotton seed oil is hydrogenated directly until of the consistency desired that on cooling frequently it tends to granulate unless chilled or very rapidly cooled. This is objectionable in culinary operations as an initial lard-like body after once heating and slow cooling in the air, often forms relatively hard granules of stearin-like bodies which look like little balls of coagulated material and separating as they do from the fluid oil under some circumstances give the product the appearance of having curdled or decomposed. By super-hydrogenating and pressing to the point required the granulating stearins or stearin-like bodies are eliminated to a greater or less extent and less easily crystallizing or non-granulating stiffening bodies remain, tending from their amorphous texture to maintain substantially the original consistency and appearance of the product in repeated culinary use.

In general I prefer to secure a product of a titer expressed as the solidifying point of said product of a range of approximately from above 10° C. to below 40° C. It of course, may vary within still greater limits according to climate and seasonal variations of atmospheric temperature. Ordinarily a product having a titer of from about 28° C. to 30° C. is well suited as lard substitute or lard compound. It should be remembered that the titer referred to herein is that not rigidly precise thermometric value derived by cooling some of the melted product and taking the point where the falling thermometric column becomes stationary which is that point where solidification takes place. The titer is considerably lower than the melting point.

For the manufacture of butter substitutes as distinguished from lard substitutes a softer product is desired, one in particular which when taken into the mouth immediately melts and does not leave a disagreeable greasy sensation on the tongue and walls of the mouth. In the manufacture of hydrogenated butter substitute as I have set forth in U. S. Letters Patent No. 1,038,545 of Sept. 17, 1912, the step of over or super-hydrogenation is desirable. In the above mentioned patent of which the present application is in a measure a continuation as regards the step of overhydrogenation, I have specified in particular the manufacture of a butter substitute involving the incorporation of hydrogenated edible oil and milk material. It is also possible to make a butter-like composition without the use of milk material, but consisting of simply edible hydrogenated oil with perhaps some flavoring material as valerian ester and the like, salt and coloring matter. The mixture of edible hydrogenated vegetable oil with ordinary butter in a proportion of two parts of the oil to one part of the butter provides very suitable butter-like material at a relatively low cost. Hydrogenated corn oil, because of its flavor is desirable for use in this way.

While the procedure of making either an edible butter-like or a lard-like compound of the present invention varies somewhat depending upon the oils or fats treated and degree of consistency desired, etc., for illustrative purposes, an edible mixture is prepared by taking cotton seed oil and corn oil in the proportion of 4 parts of the former to one part of the latter. The almost tasteless character of cotton seed oil when highly refined and also when hydrogenated is improved by the addition of corn or peanut oil giving the product a faintly nutty flavor. The mixture is super-hydrogenated by the action of hydrogen in the presence of a catalyzer to a titer of 35° C. to 40° C. and without forced hydrogenation at excessively high temperatures as hereinbefore indicated. This is cooled and pressed to bring the product to a titer of about 29° C. It is agitated with 5% more or less of fullers' earth at a temperature of 100° C. or so for about 5 minutes in order to remove any objectionable coloring matter. Or the pressed super-hydrogenated cotton seed oil product obtained in this way may be mixed with about 15% or 20% of corn oil to secure the titer desired.

I do not limit myself solely to the use of super-hydrogenated oils or similar fatty bodies. Furthermore additions in various proportion of the different kinds of oils above mentioned may be made as desired to secure mixtures of hydrogenated and ordinary oils. The defects of the ordinary oils when not added in large quantities may be in a measure compensated by the presence of the hydrogenated product and more particularly by a product which has been super-hydrogenated and pressed.

Wherever the terms oils and fat have been used herein, they are applied as is common in this art in a sense which is substantially synonymous.

In the case of oils containing considerable quantities of fatty acids, I prefer to distil these with steam under reduced atmospheric pressure, to remove the acid material, leaving the fatty mixed esters in substantially pure condition and in a form readily susceptible to the action of hydrogen.

To recapitulate, my invention relates to a composition containing edible hydrogenated oils or fats and relates in particular to oily or fatty products preferably of a composite nature containing edible hydrogenated oily or fatty material derived preferably by the over or super hydrogenation of unsaturated oily or fatty material to afford oils or fats of a butter-like or of a lard-like consistency or other desired consistency, or say of a titer ranging between 24° C. and 34° C., which product is essentially or substantially free from deleterious or toxic bodies and also free fatty acids, which is preferably substantially free from coloring matter, odor of origin, or any objectionable odor, is preferably essentially stable in storage without action on tin containers, or tendency to rancidify or to acquire a resinous flavor, or to coagulate on standing in storage with formation of objectionable masses of granulous stearin-like bodies, which stands a relatively high temperature in culinary operations without development of objectionable fumes and which preferably has a substantially amorphous texture and pronounced melting point lag; and my invention further relates to a process of making the product aforesaid.

What I claim is:

1. The process of making an edible fatty product which comprises super-hydrogenating a mixture of vegetable oils to a consistency greater than that of lard in pressing same to remove a portion of the stearin-like bodies present and in separately collecting the lard-like consistent fat resulting from pressing.

2. The process of making an edible oil product of lard-like consistency which comprises super-hydrogenating a mixture of fatty materials whereby a consistency greater than that of lard is secured, and in pressing the product whereby a portion of the stearin-like bodies are eliminated.

3. The process of making an edible fatty product of substantially lard-like consistency which comprises super-hydrogenating oily material and in freeing the product from a portion of the stearin-like bodies formed during super-hydrogenation.

4. The process of making an edible oily product of about the consistency of lard which comprises super-hydrogenating oily material, in reducing the stearin content by pressing; whereby a body of lard-like consistency is secured, and in bleaching said body.

5. An edible oil product comprising a mixture of super-hydrogenated bleached fatty material of reduced stearin content having a lard-like consistency and a titer of about 28°, said product being essentially free from linoleic compounds and toxic bodies and being characterized by a substantial retention of original consistency on slow cooling after heating and by marked melting point lag.

6. An edible oil product comprising hydrogenated bleached mixed fatty esters free from linoleic compounds and toxic bodies having a substantially lard-like consistency and a titer of about 28° C.

7. An edible oil product comprising hydrogenated bleached mixed fatty esters free from linoleic compounds and toxic bodies having a substantially lard-like consistency and a titer of about 28° C., in admixture with other fatty material.

8. An edible oil product consisting of hydrogenated oil material comprising mixed fatty esters substantially free from linoleic compounds and essentially devoid of toxic bodies, said product having a marked melting point lag and having a titer ranging approximately between 28° and 30° C.

9. An edible oil product consisting of hydrogenated oil material comprising mixed fatty esters substantially free from linoleic compounds and essentially devoid of toxic bodies, said product having a titer ranging approximately between 28° and 30° C.

10. An edible oil product of at least butter-like consistency comprising super-hydrogenated fatty esters of reduced stearin content.

11. An edible oil product of at least butter-like consistency comprising super-hydrogenated fatty esters of reduced stearin content admixed with more fluid fatty material.

12. An edible oil product of at least butter-like consistency comprising hydrogenated mixed fatty esters free from linoleic compounds and toxic bodies, said product having a titer between 24° and 34° C. and being substantially devoid of free fatty acid.

13. An edible oil product of substantially lard-like consistency comprising super-hydrogenated cotton seed oil admixed with more fluid fatty material.

14. An edible oil product of substantially lard-like consistency comprising super-hydrogenated cotton seed oil admixed with corn oil.

15. An edible oil product of substantially lard-like consistency comprising super-hydrogenated cotton seed oil of reduced stearin content having a titer of about 28° C.

16. An edible oil product comprising super-hydrogenated cotton seed oil having a titer between 24° C. and 34° C.

17. An edible oil product comprising hydrogenated cotton seed oil free from linoleic compounds and toxic bodies and having a titer of between 24° C. and 34° C.

18. An edible oil product comprising hydrogenated cotton seed oil of not exceeding a substantially lard-like consistency, free from linoleic compounds and toxic bodies; said product being free from odor of origin and substantially devoid of coloring matter and free fatty acid and having a titer between 24° C. and 34° C.

19. An edible oil product comprising hydrogenated cotton seed oil essentially devoid of toxic bodies and substantially free from linoleic compounds; said product being substantially devoid of coloring matter and free fatty acid and having a titer between 24° C. and 34° C.

20. An edible oil product comprising hydrogenated cotton seed oil of not exceeding a substantially lard-like consistency containing super-hydrogenated bodies; said product being essentially devoid of toxic bodies and linoleic compounds, being substantially free from coloring matter and free fatty acid and having a titer between 24° C. and 34° C.

21. An edible oil product comprising edible hydrogenated vegetable oil essentially devoid of toxic bodies and substantially free from linoleic compounds and coagulating substances, said product having a titer between 24° C. and 34° C. and being substantially free from odor of origin and free from free fatty acids.

22. An edible oil product comprising edible hydrogenated fatty material essentially devoid of toxic bodies and substantially free from linoleic compounds and coagulating substances, said product having a titer between 24° C. and 34° C. and being devoid of free fatty acids and odor of origin.

23. An edible oil product of substantially lard-like consistency comprising hydrogenated vegetable oil substantially free from linoleic compounds and toxic bodies and having a titer of about 28° C.

24. An edible oil product of substantially lard-like consistency comprising bleached hydrogenated vegetable oil substantially free from linoleic compounds and toxic bodies and having a titer of about 28° C.

25. A composition of substantially the consistency of butter comprising hydrogenated cotton seed oil and hydrogenated corn oil blending therewith.

26. An edible product of substantially lard-like consistency comprising edible hydrogenated oily material essentially linolein free, and stable oily material blending therewith.

27. An edible oil product of not exceeding a substantially lard-like consistency comprising cotton seed olein and cotton seed stearin having their initially present di and tri olefin bodies completely reduced, said product being devoid of odor of origin, being substantially devoid of free fatty acids and coagulating substances and having a titer between 24° C. and 34° C.

28. An edible fatty product of at least butter-like consistency comprising edible olein and stearin having initially present di and tri olefin bodies completely reduced, said product being substantially free from coagulating substances and free fatty acids and having a titer between 24° C. and 34° C.

29. An edible oil product comprising hydrogenated vegetable oil of not exceeding a substantially lard-like consistency, of a titer ranging approximately between 24° C. and 34° C., said product being essentially free from toxic bodies and deleterious substances and being substantially free from free fatty acids, coloring matters, odor of origin and any objectionable odor, said product being essentially stable in storage without action on tin containers, without tendency to rancidify or to acquire a resinous odor, and without tendency to coagulate in storage with formation of objectionable masses of granulous material; said product being capable of withstanding a relatively high temperature in culinary operations without development of objectionable fumes; and said product having a substantially amorphous texture and pronounced melting point lag.

Signed at Montclair in the country of Essex and State of New Jersey this 14th day of August A. D. 1912.

CARLETON ELLIS.

Witnesses:
F. CARBUTT,
B. M. ELLIS.